(12) United States Patent
Meir et al.

(10) Patent No.: US 8,903,823 B1
(45) Date of Patent: Dec. 2, 2014

(54) COVERAGE-BASED BUG CLUSTERING

(75) Inventors: Reshef Meir, Jerusalem (IL); Ohad Givaty, Yahud (IL); Yael Kinderman, Givat-Shmuel (IL)

(73) Assignee: Cadence Design Systems, Inc., San Jose, CA (US)

(*) Notice: Subject to any disclaimer, the term of this patent is extended or adjusted under 35 U.S.C. 154(b) by 486 days.

(21) Appl. No.: 13/115,767

(22) Filed: May 25, 2011

(51) Int. Cl.
*G06F 17/30* (2006.01)
*G06F 7/00* (2006.01)

(52) U.S. Cl.
USPC .............................. 707/737; 705/16; 705/26

(58) Field of Classification Search
USPC ......................................................... 707/737
See application file for complete search history.

(56) References Cited

U.S. PATENT DOCUMENTS

| | | | | |
|---|---|---|---|---|
| 5,414,797 A * | 5/1995 | Vassiliadis et al. | ............. | 706/46 |
| 5,848,357 A * | 12/1998 | Dehner et al. | ................ | 455/447 |
| 6,122,575 A * | 9/2000 | Schmidt et al. | ............. | 701/31.8 |
| 6,418,469 B1 * | 7/2002 | Justice et al. | ................ | 709/224 |
| 6,721,448 B2 * | 4/2004 | Rao et al. | ....................... | 382/164 |
| 7,480,764 B2 * | 1/2009 | Park | ............................. | 711/112 |
| 2002/0129039 A1 * | 9/2002 | Majewski et al. | ............. | 707/200 |
| 2005/0210189 A1 * | 9/2005 | Park | ............................. | 711/112 |
| 2005/0289404 A1 * | 12/2005 | Maguire | ......................... | 714/57 |

OTHER PUBLICATIONS

Arunajadai, S. G., et al., "Failure Mode Identification through Clustering Analysis," Qual. Reliab. Engng. Int., 2004, pp. 511-526, vol. 20, issue 5.

Davidson, I., et al., "Efficient Incremental Constrained Clustering." In proceedings of the 13th ACM SIGKDD international conference on knowledge discovery and data mining (San Jose, California, USA, Aug. 12-15, 2007), pp. 240-249.

Denmat, T., et al., "Data Mining and Cross-Checking of Execution Traces: a Re-interpretation of Jones, Harrold and Stasko Test Information Visualization," In Proceedings of the 20th IEEE/ACM international Conference on Automated Software Engineering (Long Beach, CA, USA, Nov. 7-11, 2005), ASE '05, pp. 396-399, ACM, New York, NY.

Dickinson, W., et al., "Pursuing Failure: The Distribution of Program Failures in a Profile Space," In Proceedings of the 8th European Software Engineering Conference Held Jointly with 9th ACM SIGSOFT International Symposium on Foundations of Software Engineering (Vienna, Austria, Sep. 10-14, 2001), ESEC/FSE-9, 2001, pp. 246-255, ACM, New York, NY.

(Continued)

*Primary Examiner* — Pavan Mamillapalli
(74) *Attorney, Agent, or Firm* — Holland & Knight LLP; Mark H. Whittenberger, Esq.

(57) ABSTRACT

Embodiments provide tools and techniques for clustering failing runs in a design verification environment to aid in determining causes of the failing runs. Embodiments may include determining multiple failing runs of the design verification environment. Multiple partitions of the multiple failing runs may be generated. Each respective partition may partition one or more subsets of the multiple failing runs into one or more non-overlapping clusters of failing runs. The multiple partitions of the subsets of multiple failing runs may be merged into a hierarchical structure that includes at least one of the clusters. One or more clusters of failing runs from the merged hierarchical structure may be selected; these may be referred to as core clusters. Core clusters may be presented to a user based on the size and distance between the clusters.

27 Claims, 7 Drawing Sheets

(56) References Cited

OTHER PUBLICATIONS

Hao, D., et al., "A Similarity-Aware Approach to Testing Based Fault Localization," In Proceedings of the 20th IEEE/ACM international Conference on Automated Software Engineering (Long Beach, CA, USA, Nov. 7-11, 2005), ASE '05, pp. 291-294, ACM, New York, NY.

Liblit, B., et al., "Scalable Statistical Bug Isolation," In Proceedings of the 2005 ACM SIGPLAN Conference on Programming Language Design and Implementation (Chicago, IL, USA, Jun. 12-15, 2005), PLDI '05, pp. 15-26, ACM, New York, NY.

Meir, R., et al., "Learning the Bug from Many Runs: A New Coverage-Driven Approach for Automatic Debugging," Cadence Technical Conference (Anaheim, California, May 2005), 6 pages.

Podgurski, A., et al., "Automated Support for Classifying Software Failure Reports," In proceedings of ICSE, IEEE Computer Society, 2003, pp. 465-475.

Renieris, M., et al., "Fault Localization With Nearest Neighbor Queries," In Proceedings of the 18th IEEE International Conference on Automated Software Engineering (Montreal, Quebec, Oct. 2003), pp. 30-39.

Zheng, A. X., et al., "Statistical Debugging: Simultaneous Identification of Multiple Bugs," In Proceedings of the 23rd International Conference on Machine Learning (Pittsburgh, Pennsylvania, Jun. 25-29, 2006), ICML '06, pp. 1105-1112, vol. 148, ACM, New York, NY.

\* cited by examiner

COVERAGE-BASED BUG CLUSTERING

BACKGROUND

There are different ways to determine bugs located in a Device Under Test (DUT) or in its Verification Environment (VE); the entire system may be referred to as the DVE. For example, a typical session may contain many failing runs, but usually only several distinct root causes ("bugs"). However, wrong classification might result in two or more engineers debugging the same problem, while other bugs are being neglected. Moreover, correct classification may be a necessary condition for many automatic debugging tools, which may assume that all failures are due to the same bug.

In some cases, a failure may have an elaborate error message that may enable the user to decide quickly whether two failing runs exhibit the same bug, i.e., both fail due to the same root cause (and also to debug it). Unfortunately, many DVEs lack such elaboration, and even when one exists, it may have shortcomings such as the following: (i) it contains a lot of information that clutters the actual cause of the error; (ii) it may fail to describe the "correct" level that distinct different bugs. For example, one may have runs with several different bugs, all of which end up crashing due to "memory overload", which appears in the error message, but does not help us to isolate the different root causes.

There is thus a need for tools and techniques that can be used to identify runs according to their bug, or root cause.

BRIEF SUMMARY

Embodiments provide tools and techniques for identify bugs that are located in a Device Under Test (DUT) or in its Verification Environment (VE). The entire system is referred to as the DVE. A set of runs that were generated at random may contain runs that failed due to different, independent bugs. Embodiments may classify or cluster the large number of runs according to their bug, or root cause. Embodiments may include an automated clustering system based on statistical analysis of properties of the run such as code coverage and functional coverage, with minimal manual effort from the user.

Embodiments may include clustering method that combine an intuitive flow and interface with a sophisticated structured search methods. Embodiments may utilize the following observations: (a) for each bug, or root cause, there is usually a small set of coverage properties ("profile") that are statistically correlated with this bug. Moreover these properties may be uncorrelated with other independent bugs; (b) for each bug, there may be several runs that exhibit the "prototypical behavior" (i.e. that fit the profile well), while other runs may partially fit one profile or more, and are therefore harder to classify.

Some embodiments may include a method of clustering failing runs in a design verification environment to aid in determining causes of the failing runs, in accordance with various embodiments. The method may include determining multiple failing runs of the design verification environment. Multiple partitions of the multiple failing runs may be generated. Each respective partition may partition one or more subsets of the multiple failing runs into one or more non-overlapping clusters of failing runs. In some cases, a partition may not necessarily include all the determined failing runs. In some cases, a partition may partition one or more subsets of failing runs associated with a failure class. The multiple partitions of the subsets of multiple failing runs may be merged into a hierarchical structure that includes at least one of the clusters. One or more clusters of failing runs from the merged hierarchical structure may be selected; these may be referred to as core clusters.

In some embodiments, the method of clustering failing runs may include one or more clusters that is each represented by one or more attributes. One or more grades for each respective cluster based on their respective attributes may be determined. The one or more grades may include an external grade, an internal grade, and/or a total grade. An external grade may represent the union of all attributes that correlate with a failure. The internal grade may represent a measure of whether the cluster is consistent. The total grade may represent a measure of the internal and external grade.

In some embodiments, the method of clustering failing runs may include separating the multiple failing runs into multiple failure classes. Generating multiple partitions of the failure runs may includes partitioning into the separate classes.

In some embodiments, the method of clustering failing runs may include receiving input from a user to determine one or more of the multiple partitions. The user provided input may include coverage definitions. Some embodiments may include presenting the selected one or more clusters to a user.

Some embodiments may include a method of clustering failing runs in a design verification environment to aid in determining causes of the failing runs that provides a list of core clusters based on order of determined core clusters from the merged hierarchical structure. A first cluster from the multiple core clusters may be identified, where the first cluster includes the largest number of failing runs compared to the other core clusters. A second cluster from the multiple core clusters may be determined. The second core clusters may be the most distant core cluster from the first cluster within the merged hierarchical structure. In some cases, additional core clusters may be identified, where each subsequent identified cluster is the most distant core cluster from the previously identified core clusters. A list of core clusters based on the order of the determined core clusters may be presented to a user.

Some embodiments may include a system for clustering failing runs in a design verification environment to aid in determining causes of the failing runs. The system may include a storage medium and a processor coupled with the storage medium, the processor configured for clustering failing runs of the design verification environment by a configuration to: determine multiple failing runs of the design verification environment; generate multiple partitions of the multiple failing runs, each respective partition partitions one or more subsets of the multiple failing runs into one or more non-overlapping clusters of failing runs; merge the multiple partitions of the multiple failing runs into a hierarchical structure that includes at least one of the clusters; and select one or more clusters of failing runs from the merged hierarchical structure Some embodiments may include a machine-readable storage medium containing program instructions that, when executed by a controller within a computer, cause the controller to execute a method of clustering failing runs in a design verification environment to aid in determining causes of the failing runs. The method includes: determining multiple failing runs of the design verification environment; generating multiple of the plurality of failing runs, each respective partition partitions one or more subsets of the multiple failing runs into one or more non-overlapping clusters of failing runs; merging the multiple partitions of the multiple failing runs into a hierarchical structure that includes at least one of the clusters; and selecting one or more clusters of failing runs from the merged hierarchical structure.

BRIEF DESCRIPTION OF THE DRAWINGS

The present disclosure is described in conjunction with the appended figures.

Figure 1:
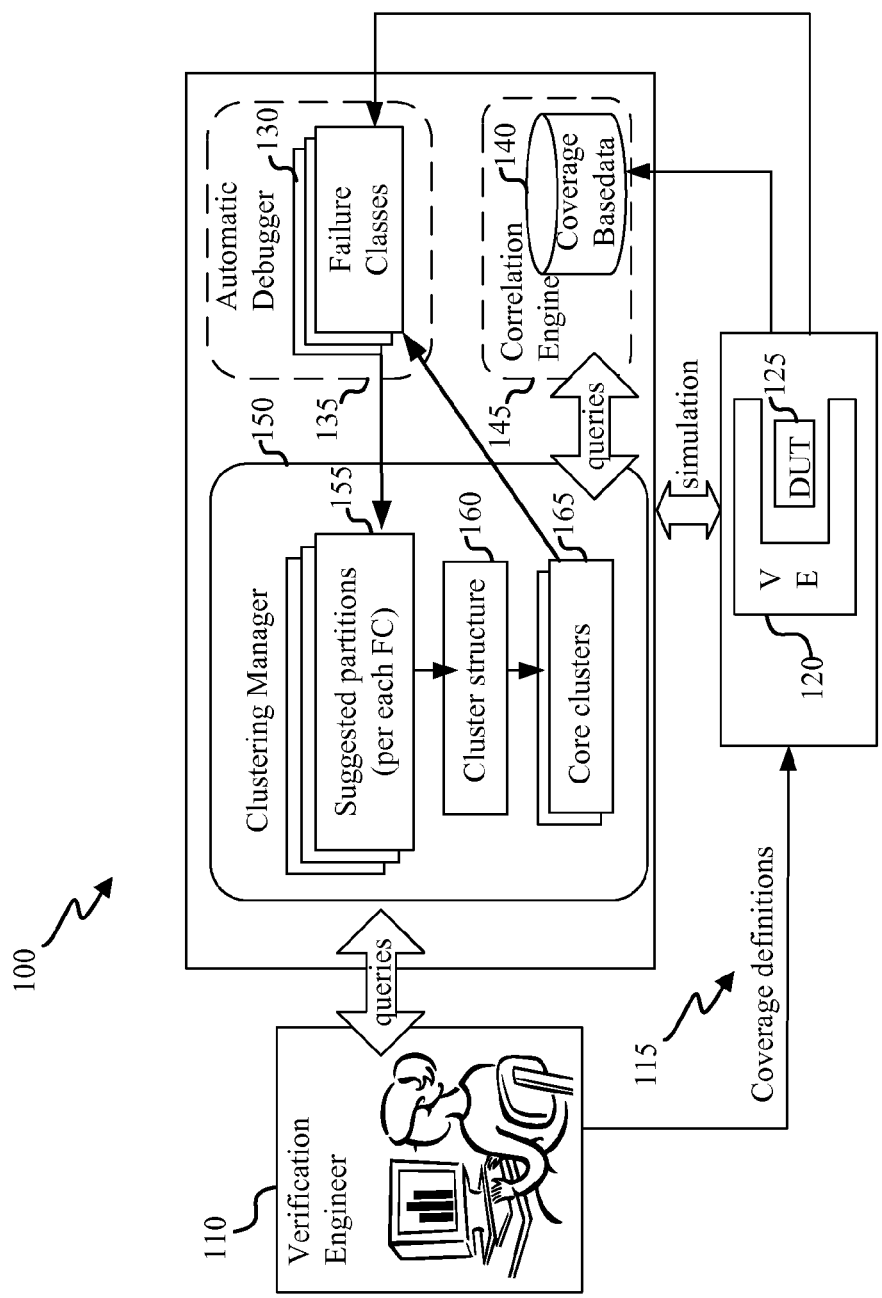
FIG. 1 provides a diagram of a system with clustering modules and other aspects that may be utilized for automated debugging using bug clustering methods, in accordance with various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments may provide tools and techniques for identify bugs that are located in a Device Under Test (DUT) or in its Verification Environment (VE). The entire system is referred to as the DVE. A set of runs that were generated at random may contain runs that failed due to different, independent bugs. Embodiments may classify or cluster the large number of runs according to their bug, or root cause. Embodiments may include an automated clustering system based on statistical analysis of properties of the run such as code coverage and functional coverage, with minimal manual effort from the user.

Embodiments may include clustering methods that combine an intuitive flow and interface with a sophisticated structured search methods. Embodiments may utilize the following observations: (a) for each bug, or root cause, there is usually a small set of coverage properties ("profile") that are statistically correlated with this bug. Moreover these properties may be uncorrelated with other independent bugs; (b) for each bug, there may be several runs that exhibit the "prototypical behavior" (i.e. that fit the profile well), while other runs may partially fit one profile or more, and are therefore harder to classify.

Embodiments may utilize the first observation to generate a (possibly large) set of alternative partitions, and then merge them into a hierarchical structure. Embodiments may then extract the most reasonable clusters from this structure, relying only on the runs that we consider as prototypical. In some embodiments, final clusters may be selected according to criteria such as the following: (1) the runs in each cluster exhibit similar behavior; (2) the runs in different clusters exhibit distinct behaviors; or (3) the clusters contain as many runs as possible.

In some cases, embodiments may include finding a partitions where all failing runs fall into a small number (for example, 2-3 runs) of sets, where each set exhibits a distinct faulty behavior, which is absent in all other sets (including the passing runs). In some cases, such an ideal partition does not always exist, because of interdependencies between program variables, properties, and/or natural noise. The problem of noise, i.e. properties that are correlated with the failure by chance, can be accentuated by the fact that some embodiments utilize samples sets (i.e. number of failing runs) that are small. Some embodiments provide methods for extracting partial clusters from the hierarchical structure that may balance the three criteria.

Embodiments may result in is a small number of core clusters, such that each core cluster represents a different bug. In some embodiments, a user can then apply manual or automated debugging tools on each bug separately, perhaps assigning different bugs to different engineers to work in parallel.

Some embodiments may work with a small number of runs. Whereas statistical methods typically can require thousands of samples (i.e. runs), embodiments may work properly with as few as 200-300 runs, and even less if the failures are distinguished enough. Therefore, some embodiments can be applied in the hardware domain, where runs may be scarce and/or expensive.

Some embodiments may avoid heavy computations, thus may complete the clustering process in a few seconds (typically less than a second), even when the initial number of properties is over 100K, for example.

Some embodiments may include robust methods. For example, some embodiments may not always be able to find a good partition. However, when some embodiments fail, they may give an explicit indication, rather than returning some arbitrary result. This may be particularly important since a wrong partition may result in two or more engineers debugging the same problem, which can be worse (in terms of wasted effort) than doing the clustering manually. Some embodiments thus tend to a "one-side error": although core clusters may be partial, they rarely contain runs from other clusters.

Some embodiments may be able to avoid an understandability problem that may affect other statistic methods. In the context of debugging, most statistical methods, and clustering methods in particular, suffer from the understandability problem: even when results are correct in hindsight, users (who are usually not experts in statistics) often find it difficult to understand the results and therefore do not trust them. Moreover, if the clustering method causes the user to waste time trying to figure out a wrong cluster (even if this happens infrequently), the trust level in the machine may sharply deteriorate. Some embodiments may provide advantages in this context.

For example, some embodiments may include identifying each cluster with a small number of coverage buckets (typically one), which are highly familiar entities to verification engineers. Thus by looking at each cluster, the user can sometimes identify right away the cause of the bug, saving precious debug time. In contrast, the user can say that this bucket is irrelevant to the bug, and make sure it is ignored in the future.

Some embodiments may include cluster selection methods that are incremental and thus stable. The first clusters are usually quite distinctive and the user can safely assume they represent different bugs. As the user gains more confidence in the machine, or if there are "spare" engineers, they can work on the latter, less reliable clusters.

Often the user already has some knowledge on the clusters he expects to see (as described earlier). Some embodiments can integrate easily with partial user directives, such as error messages, considering them as (particularly important) parts of the hierarchical structure. Further, some embodiments can be easily augmented with additional user input in various forms, such as number of clusters, pairs of runs that must/cannot belong to the same cluster, etc.

The following description may use some of the following terminology do explain different embodiments. This terminology is used to describe embodiments, but other terminology may be useful.

Some embodiments may utilize runs, where a run may represent a single simulation run. In some embodiments, runs that failed due to some error may be referred to as failing runs or bad runs. Runs that are completed without issuing any error may be referred to as passing runs or good runs.

Some embodiments may also refer to items and/or buckets. These may include, but are not limited to, standard functional coverage items and/or buckets, as defined by the user in a coverage model, for example. Items, attributes, and/or buckets may also include, but are not limited to, automatically generated code coverage. In some embodiments, each bucket may be a binary attribute (with value True/False in each run). In some embodiments, final items may be refer to as a bucket where exactly one bucket is true in each run.

In some embodiments, a failure class refers to a set of runs that are initially classified as having the same bug. Runs may be initially classified as having the same bug for a variety of reasons including, but not limited to, because the runs have the same error message or because the runs contain a specific error pattern as defined by the user.

In some embodiments, a core cluster refers to a set of failing runs that are believed to contain the same bug, or root cause, of a failure. A profile may refer to one bucket or more whose occurrence distinguishes a specific core cluster from other core clusters.

Some embodiments may include suggested clusters that refer to any set of failed runs that share a profile. Suggested clusters may be considered as candidates for core clusters. In some embodiments, the buckets themselves are not explicitly clustered. Some embodiments may included suggested partitions where a suggested partition contains several suggested clusters. Clusters may overlap. In addition, clusters may contain a set of non-clustered runs in a separate special cluster.

FIG. 1 provides data flow between clustering modules and other parts of system 100 for automated debugging using bug clustering methods in accordance with various embodiments. FIG. 1 shows how clustering methods may interact with other parts a debugging system 100. In particular, the results of a clustering method may be used by automatic debugging tools to accelerate the debugging process. For example, user 110 may add coverage definitions 115, or other input information, to the verification environment 120. Through simulation of device under test 125 in verification environment 120, failures may be collected and classified into failure classes 130. In some embodiments, failure classes 130 will be part of automatic debugger 135. Coverage information may also be collected and stored in coverage database 140. The system may further process the information and stores it in a correlation engine 145. Correlation engines are further described in U.S. application Ser. No. 12/950,613, entitled TRANSACTION CORRELATION SYSTEM, incorporated by reference herein for all purposes. For each failure classes 130, a clustering manager 150 may generate suggested partitions 155 and a cluster structure 160; this process is discussed in more detail below. Finally, core clusters 165 may be isolated from the structure; this process is discussed in more detail below, and added as new failure classes 130.

Embodiments may include clustering runs into one or more failure classes. Some embodiments may be described as having multiple aspects. For example, some embodiments may include several aspects where a hierarchical structure is created that represents beliefs, possibly contracting, on the partition of a failure class into different bugs. In another aspect, the hierarchical structure may be traverse sequentially, searching for the next best core cluster in each iteration.

Some embodiments may include determining a hierarchical structure based on merging several partitions. The following provides one description of how some embodiments may do these steps, though other embodiments utilize additional and/or different steps. Candidate buckets that may be useful for partitioning one or more failure classes may be determined or collected. The number of initial candidates might be large in some cases. For example, initial candidates may be up to or more that one hundred thousand candidates. Each bucket may represent a suggested cluster (i.e. all runs with this bucket). Different filtering techniques may be utilized that identify sub-predictors, or candidates that can be a partial cause of a failure; these filtering techniques may include simple heuristics that provide this identification.

In some embodiments, the number of selected candidates may be limited. The number of selected candidates may be limited in order to increase performance. Some embodiments may be limited to less than or approximately one hundred candidates.

Some embodiments may utilize user input. These may be referred to as hints from a user. Such input can arrive in several forms. For example, a user may provide suspected patterns. The user may suspect that all bad runs exhibiting a specific pattern share the same bug. A common semi-manual approach may be to explicitly describe these patterns, and cluster together all runs that share the same pattern. Embodiments may take each such pattern, and treats it as a failure class. A user may provider attributes. Although there may be a very large number of attributes, sometimes the user may know that some of them are particularly important (or conversely, completely useless) with respect to identifying the bug (for example, configuration attributes). Embodiments may allow a user to add weights to specific attributes (default weight is 1), and this weight may be considered when computing the grade of core clusters and partitions. A user may also provide constraints. Sometimes the user may know that a specific pair of runs must (or must not) have the same bug. Embodiments may take such constraints (called positive and negative constraints, respectively) into account by eliminating in all partitions, during a partition structure create step, that violate such a constraint.

Some embodiments may create one or more suggested partitions for each failure class. In some embodiments, more than one suggested partition may be created. To create suggested partitions, embodiments may generate pairs and/or triplets of buckets (i.e. of clusters). Each such pair or triplet may define a suggested partition. Some embodiments may include larger sets of buckets to create a partition, such as quadruplets or quintuplets, merely by way of example.

The partitions may be evaluated to determine if they are good partitions. Embodiments may include filtering out as many buckets as possible, without losing candidates that could be later combined into good partitions. To achieve this in some embodiments, a hypothetical best partition may be constructed for each bucket. Embodiments may provide one or more measures to determine whether a partition is a good partition. These measures may be referred to as grades in some cases. In some embodiments, these measures may provide an upper bound on the grade of any real partition that can be constructed using a given bucket.

Some embodiments may utilize one or more thresholds. A threshold may be utilized to determine which partitions to keep and which to discard. For example, if the grade for a partition is below a threshold, it may be thrown away. This approach may rely on a common heuristic that the same attributes that are correlated with the failure can help in the clustering process.

In some embodiments, an internal grade and an external grade may be determined for the partitions. Partitions whose combined grades is lower than a threshold may be filtered out.

Some embodiments may provide grades to partitions in the following matter. Given a tuple of binary attributes $T=(X1, X2, \ldots, Xk)$, each of which representing a cluster, embodiments may provide a measure of how likely is the assumption that each such cluster represents a different bug. In some embodiments, a tuple may be a pair of attributes or triple of attributes. Informally, a good partition may be (a) a good bug predictor, i.e., the union of all attributes correlates well with the failure and/or (b) mutually exclusive, i.e. the attributes/ clusters do not overlap. The first property (a) may be formalized as an external grade. In some embodiments, an external grade may be determined as follows:

External Grade($T$)=$Pr(U(T)|$bad runs$)-Pr(U(T)|$good runs$)$ where $U(T)$ is the union of all properties in the tuple T, i.e., $U(T)$ is True whenever either $Xi$ is True. Low external grade may mean either that too many failures are not explained by T, or that too many passed runs are considered as failed runs.

The second property (b) may be formalized as the internal grade. In some embodiments, an internal grade may be determined as follows:

Internal Grade($T$)=#{bad runs that belong to exactly one $Xi$}/#{bad runs}.

A low internal grade may suggests that the partition T is inconsistent, with large overlap of clusters. It may ignore the passing runs.

In some embodiments, T may have a high grade if it has both high internal and external grades. This may be defined in some cases using the following:

Grade($T$)=harmonic mean(External Grade($T$),Internal Grade($T$))=2/(1/External Grade($T$)+1/Internal Grade($T$)).

Some embodiments may utilize other measures for determining internal and external grades along with determining an overall grade reflecting both the internal and external grade.

Some embodiments may handle partitions that include or consist of many small clusters. In some cases, this may mean that each cluster only contains a handful or runs, such as each containing 1-3 runs. On one hand, such partition can easily have both high internal and external grades, if the clusters happen to cover the entire failure class. On the other hand, such partitions are likely to be observed by chance, as there are many properties that only occur in few runs. In the extreme case, consider the "ID" property which is unique in each run: a partition containing all IDs of runs in the failure class will always have perfect grade.

Using standard statistical approaches, some embodiments can estimate the likelihood of such events, and correct the grades (both internal and external) in accordance with corresponding confidence intervals (which depend on the number of runs). The result may be that suggested partitions with small clusters (which are far more likely) will suffer a significant reduction in their grade. In some cases, if a cluster X is given, the optimal partition containing X may be $T=(X, \{$all bad runs not in X$\})$. This is the partition that may be used when filtering the candidates.

Some embodiments may create a partition structure. In some cases, a number of suggested partitions may be utilized to create the partition structure. Merely by way of example, there may be between ten and one thousand suggested partitions as input. In some cases, there may be more or less suggested partitions. Furthermore, some of the suggested partitions may be identical, very similar, or complementing each other.

To create a partition structure, some embodiments may initialize a root node, which may correspond to an entire failure class. Partitions may be sorted by decreasing grade. The partitions may be iteratively merged into the partition structure. For example, if a current cluster matches an existing node in the structure, it may be merged with it. Otherwise, the cluster may form a new node in the structure. The new node may be a child of all nodes that contain it (i.e. that contain roughly all of its runs), and may be a parent of all nodes that it contains. Nodes may thus be descendents of the root. Embodiments may construct a partition structure that agrees with all candidate partitions. If a partition structure cannot be created that agrees with all the candidate partitions, some embodiments may indicate this information rather than providing information regarding possible clusters that may be in error.

Embodiments may utilize a variety of methods to determine cluster selection, which may be presented to a user, for example. In one embodiment, cluster selection may start at a root of the hierarchy and go down to each leaf, which may be a core cluster. At each node, a child node may be chosen to continue with. In some cases, the hierarchy that is worked down through may be a tree hierarchy, but in some cases, the hierarchy may be a non-directed graph. The process of continuing from node to node may proceed until a cluster is reached that is believed to be a best cluster or a good cluster. A best cluster may be a good cluster with a largest number of overlapping runs. Decisions regarding which node to chose go continue with may be done on a local basis.

In some embodiments, the nodes or clusters that may be chosen may be a largest or biggest leaf node. Embodiments may be seek clusters that are as big as possible. Once a leaf or cluster is chosen, other leafs or clusters may be chosen. Some embodiments may chose these subsequent clusters based on distance. For example, a subsequent leaf, such as the second leaf chosen after the first leaf, may be selected such that it is distant from the first leaf. In some cases, it may be chosen to be the farthest away from the first leaf. The idea of using distance separation between selected leaves allows from the selection process to chose the mostly likely leaves that result from different bugs. The hierarchical merged structure discussed above provides a metric that may facilitate this selection process. For example, nodes are farther away from each other if their nearest mutual parent is higher up in the hierarchy.

In some embodiments, cluster selection may proceed by selecting a first leaf, which may be a biggest leaf. Once a leaf has been selected, the path from the root to the leaf may be marked in some way, which may be referred now to as a selected path. The next time the hierarchy is traversed, the selected path may be avoided as much as possible. As this continue, multiple paths may end up marked. In some embodiments, each node that is on a path may be marked to reflect the number of times the node has been included on a path, or the number of times that the node has been visited. Each time the hierarchy is traversed, nodes may be selected that have the lowest number of visits.

Embodiments may utilize different methods for making cluster selections. In one embodiment, each node may be assigned a value that reflects the number of times it is visited as the hierarchy is searched. Nodes may then be avoided during the selection process that have been visited the most times as part of the process of selected nodes in an order such that are furthest away from each other.

For example, each node may be initialized to zero representing that each node has yet to be visited. In every iteration, the following may occur. Starting from a root, a procedure may be done to find the next leaf, or next cluster. The path from the root to the next leaf may be marked, increase the number of visits by one.

In some cases, some clusters may be large and some clusters may be small. In some embodiments, the large cluster may be selected. In some cases, the large clusters may overlap. After a cluster is selected, the cluster may be mark as overlapping so that it is not selected again.

In some embodiments, a process of cluster selection may be represented by the following pseudocode:
  Set node.clusters_picked=0 for all nodes
  While there are free leaf nodes:
   L→F find next_leaf(root)
   For all ancestors of L, node.clusters_picked+=1
   Create the next core cluster C from L's non-overlapping runs
   Mark all runs in C as overlapping
  Return all core clusters (C1, C2, . . . )

In some embodiments, a process of selecting core clusters to present in a particular order, which may represent an order for the core clusters to be analyzed may be represented by the following pseudocode:
  Find_next_leaf(Node)
  If node is a leaf, return Node
  Otherwise:
   Good children←all children of Node, such that "clusters_picked" is minimal
   Best_child←the good child with the largest number of non-overlapping runs
  Return Find←next←leaf(Best←child)

FIGS. 2A and 2B shows two examples of the clustering method in accordance with various embodiments. Each example includes a respective failure classes 210-*a* and 210-*b* and core clusters 220-*a* (represented as cluster C or E, cluster D, and cluster F) and 220-*b* (represented as cluster Z and cluster Y). In FIG. 2A, there are 3 partitions 230, 231, and 232, that do not contradict one another. They are merged to the structure 240 (cluster C absorbs cluster E), and all 3 leafs are selected as core clusters. In this case, almost all runs of the initial failure class are covered (except for some runs in B that we are not sure about). In FIG. 2B, the two partitions 214 and 214 are disagreeing on most runs. However, both partitions agree that runs from Z and Y belong to different core clusters, as evident from the structure. FIG. 2B also show the resulting merged hierarchical structure 241.

FIGS. 2A and 2B also show embodiments where core clusters may be selected and presented to a user in a specific order, for example. Referring to FIG. 2A, cluster C, which is the same as E, may be chosen as the first core cluster as it is the largest cluster. Examining the other clusters, clusters C and D have a mutual parent A, while C and F have a mutual parent failure, class 1, which is higher up in the hierarchy; cluster F is the most distant cluster from cluster C within failure class 1. Therefore, cluster F may be chosen as the next cluster to present. From cluster F, cluster D may then be chosen as the next leaf that is furthest away, as in this case it is the only one left. A list of ordered core clusters 250 may be provided in some embodiments. Referring to FIG. 2B, as noted above, partitions 214 and 215 disagree on most runs, however, both partitions agree that runs for Z and Y belong to different core clusters. Core clusters Z and Y may then be selected 251 and presented to a user.

Embodiments above describe examples involving individual failure classes. In some cases, several failure classes can be created due to distinct error messages, for example. In this case, the distinct failure classes can remain distinct. Embodiments may utilize the methods to creating a hierarchical structure independently for each failure class. Before a cluster selection step, the resulting hierarchical structures for each failure class can be joined into a single structure, by adding a top node above the root of all structures. Core cluster selection may then proceed, starting from the top root. This process may guarantee that after selecting a core cluster from, say a failure class 1, the next core cluster form some other failure class, say failure class 2, may be selected, and so on repeatedly until all core clusters are exhausted. FIG. 3 shows an example of this where the two failure classes of FIGS. 2A and 2B have been joined together.

Figure 2:
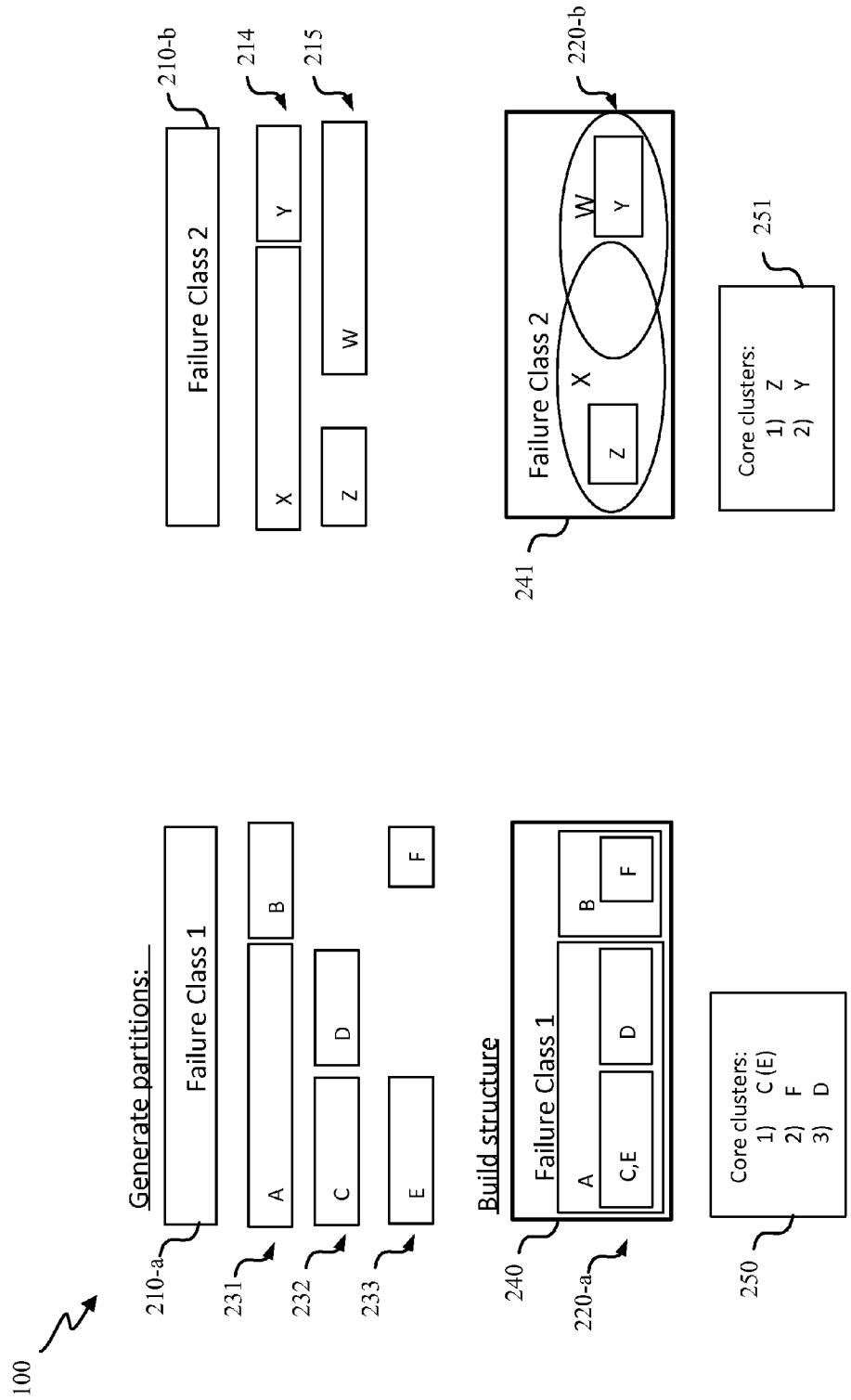
FIG. 2A and FIG. 2B provide examples of clustering methods, in accordance with various embodiments.
Figure 3:
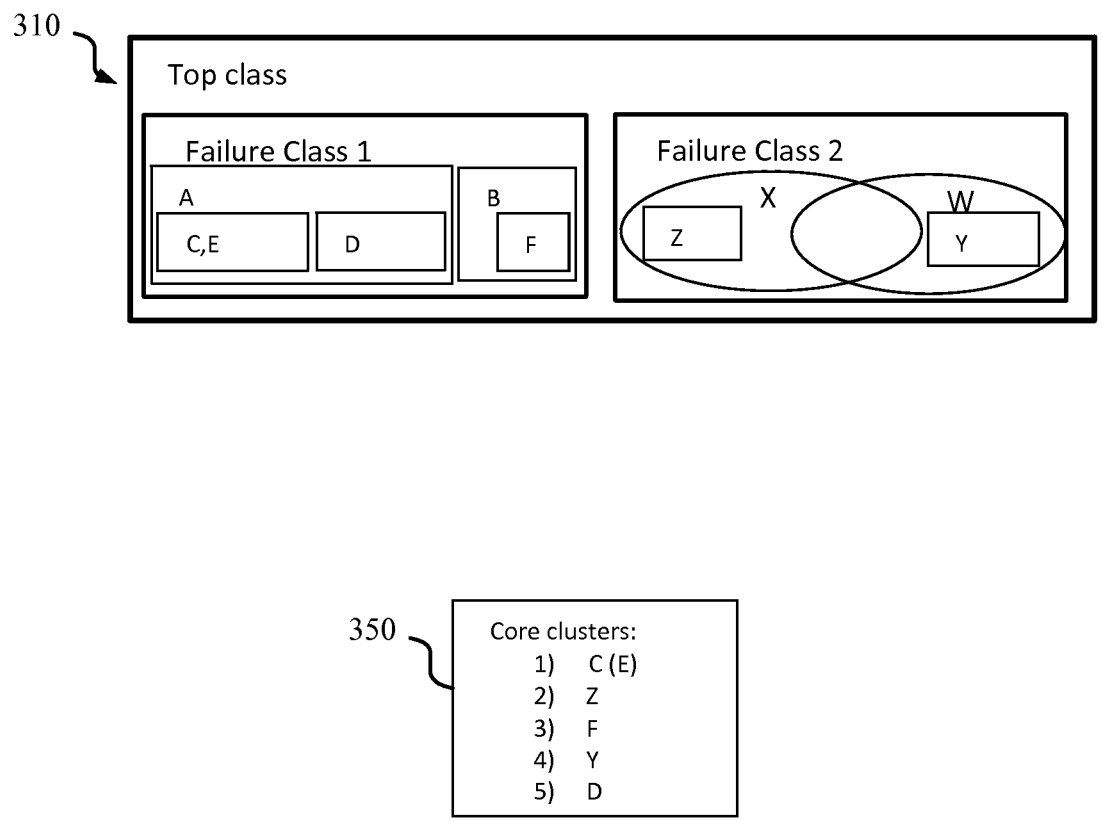
FIG. 3 provides an example of a clustering method utilizing multiple failure classes, in accordance with various embodiments.

FIG. 3 shows a top node or top class 310 that joins hierarchical structures from failure class 1 220-*a* of FIG. 2A and failure class 2 220-*b* of FIG. 2. Failure classes 210-*a* and 210-*b* from FIGS. 2A and 2B respectively may result from two distinct error messages. Core clusters from both failure class 1 and failure class 2 may then be joined and ordered 350 based on size and distance. For example cluster C may be selected first as the largest core cluster. The next most distant cluster from C may then be chosen, which is cluster Z in this case. Cluster F is then the most distant from the previous clusters, followed by Y and finally D.

Some embodiments may be transparent such that results may be reliable to users (and to enable the user to correct mistakes). In terms of the input, some embodiments may be transparent because user may provide information to explicitly state a set of binary features that are sampled along the run (the e coverage definitions are a special case of such directives). Some embodiments may perform best when the number of runs is in the 100s. Requests for more sophisticated directives such as constraints, functional and temporal relations may imply that some other method is being used.

Some embodiments may include output that is more prominent than with other methods. Some embodiments may include partitions that cover significant portion of the total runs, but not necessarily all of them. In contrast, most other methods may not leave unclassified failures, so this is a distinctive sign. Also, in some embodiments, suggested partitions may include clusters that are characterized by a single attribute. Some embodiments provide access to the hierarchical structure from which the clusters were selected.

Figure 4:
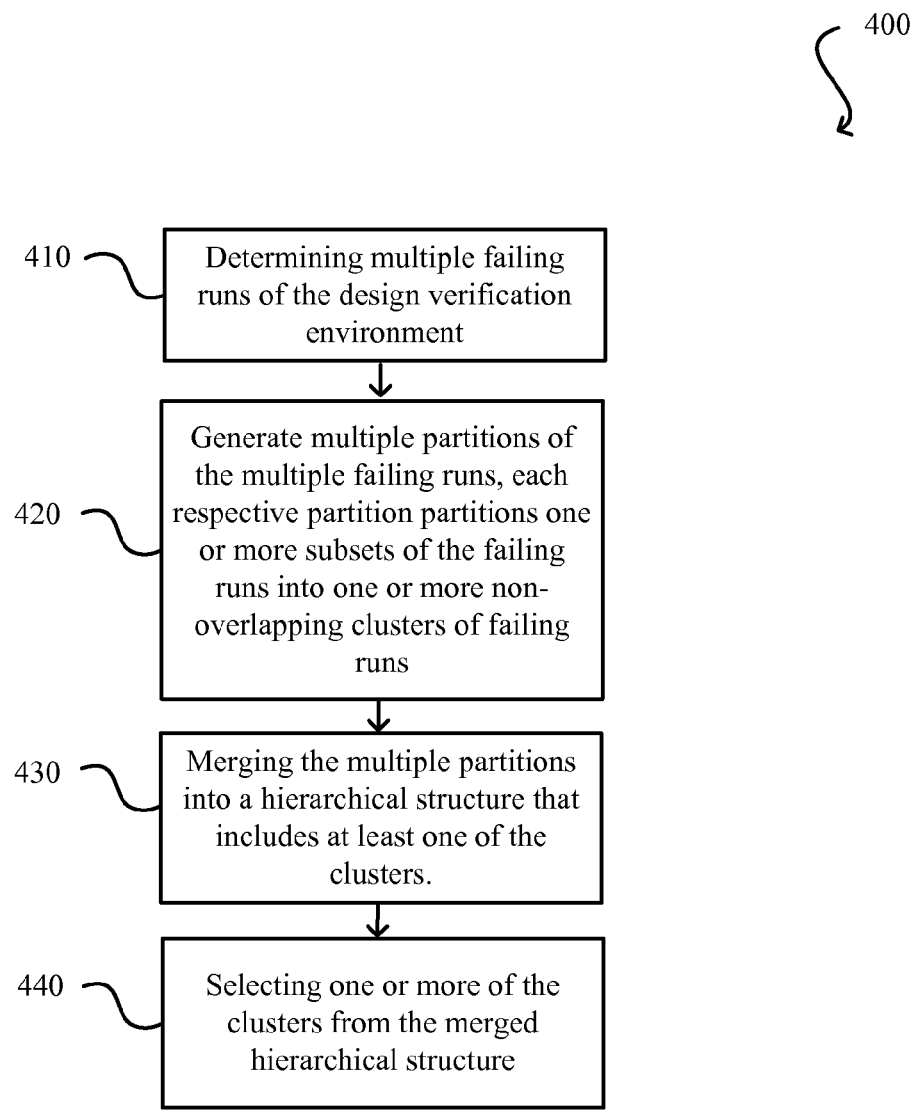
FIG. 4 provides a flow diagram of a method of clustering failing runs, in accordance with various embodiments.

FIG. 4 provides a flow diagram of a method 400 of clustering failing runs in a design verification environment to aid in determining causes of the failing runs, in accordance with various embodiments. Method 400 may be implemented in systems such as system 100 of FIG. 1, system 600 of FIG. 6, and/or system 700 of FIG. 700. Method 400 may also utilize numerous aspects discussed above. At block 410, method 400 may include determining multiple failing runs of the design verification environment. Multiple partitions of the multiple failing runs may be generated at block 420. Each respective partition may partition one or more subsets of the multiple failing runs into one or more non-overlapping clusters of failing runs. In some cases, a partition may not necessarily include all the determined failing runs. In some cases, a partition may partition one or more subsets of failing runs associated within a failure class. The multiple partitions of the subsets of multiple failing runs may be merged into a hierarchical structure that includes at least one of the clusters at block 430. Some embodiments may create multiple merged hierarchical structures, for example, one hierarchical structure for each failure class. Multiple merged hierarchical structures may be merged into a single hierarchical structure in some cases. One or more clusters of failing runs from the merged hierarchical structure may be selected; these may be referred to as core clusters at block 440.

In some embodiments, the method of clustering failing runs may include one or more clusters that is each represented by one or more attributes. One or more grades for each respective cluster based on their respective attributes may be determined. The one or more grades may include an external grade, an internal grade, and/or a total grade. An external grade may represent the union of all attributes that correlate with a failure. The internal grade may represent a measure of whether the cluster is consistent. The total grade may represent a measure of the internal and external grade.

In some embodiments, the method of clustering failing runs may include separating the multiple failing runs into multiple failure classes. Generating multiple partitions of the failure runs may includes partitioning into the separate classes.

In some embodiments, the method of clustering failing runs may include receiving input from a user to determine one or more of the multiple partitions. The user provided input may include coverage definitions. Some embodiments may include presenting the selected one or more clusters to a user.

Figure 5:
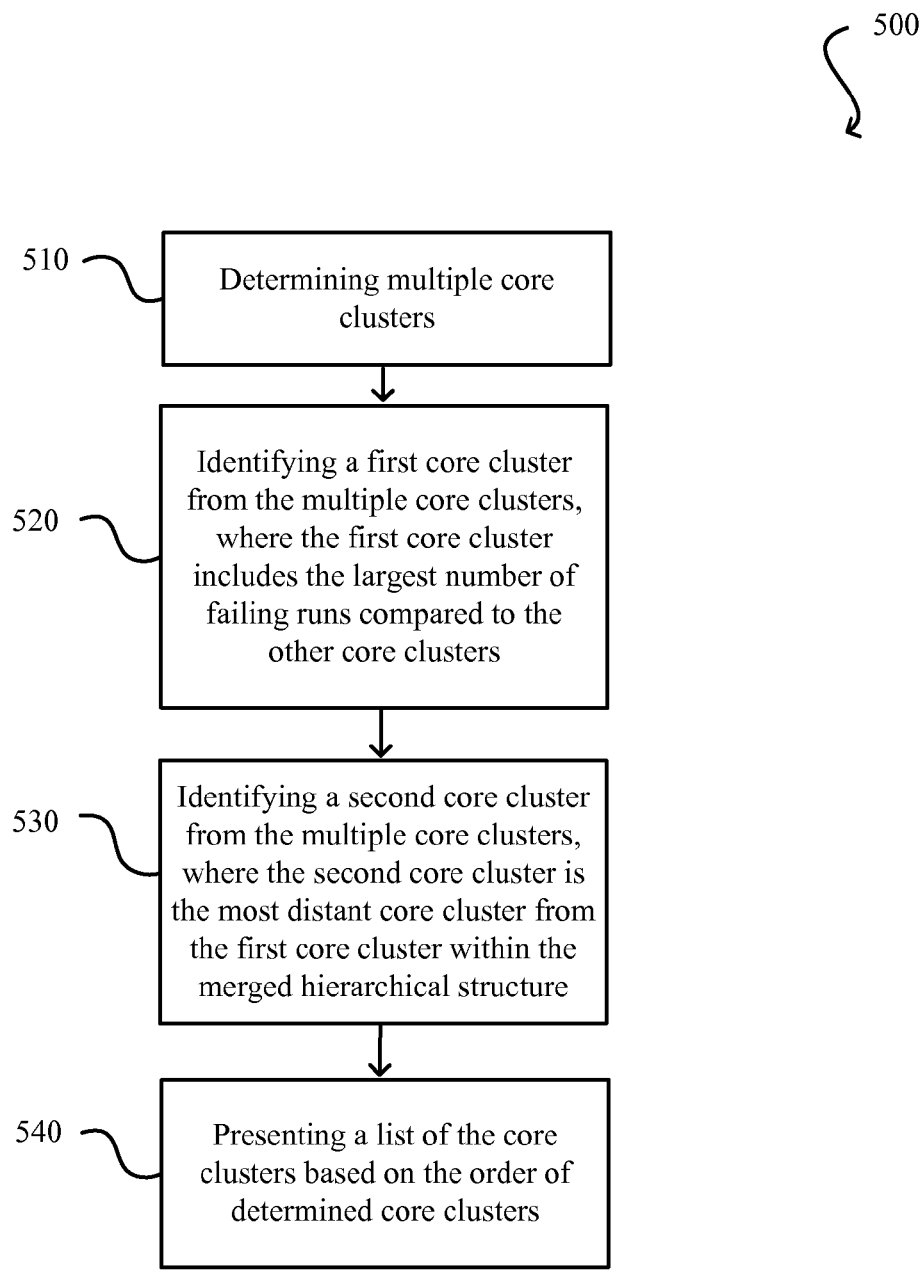
FIG. 5 provides a flow diagram of a method of selecting an order for determined core clusters, in accordance with various embodiments.

FIG. 5 provides a flow diagram of a method 500 of clustering failing runs in a design verification environment to aid in determining causes of the failing runs, in accordance with various embodiments. Method 500 may be implemented in systems such as system 100 of FIG. 1, system 600 of FIG. 6, and/or system 700 of FIG. 700. Method 500 may be utilized in conjunction with method 400 of FIG. 4. FIG. 500 may also utilize numerous aspects discussed above. At block 510, multiple core clusters may be determined from a merged hierarchical structure. At block 520, a first cluster from the multiple core clusters may be identified, where the first cluster includes the largest number of failing runs compared to the other core clusters. At block 530, a second cluster from the multiple core clusters may be determined. The second core clusters may be the most distant core cluster from the first cluster within the merged hierarchical structure. In some cases, additional core clusters may be identified, where each subsequent identified cluster is the most distant core cluster from the previously identified core clusters. At block 540, a list of core clusters based on the order of the determined core clusters may be presented to a user.

Figure 6:
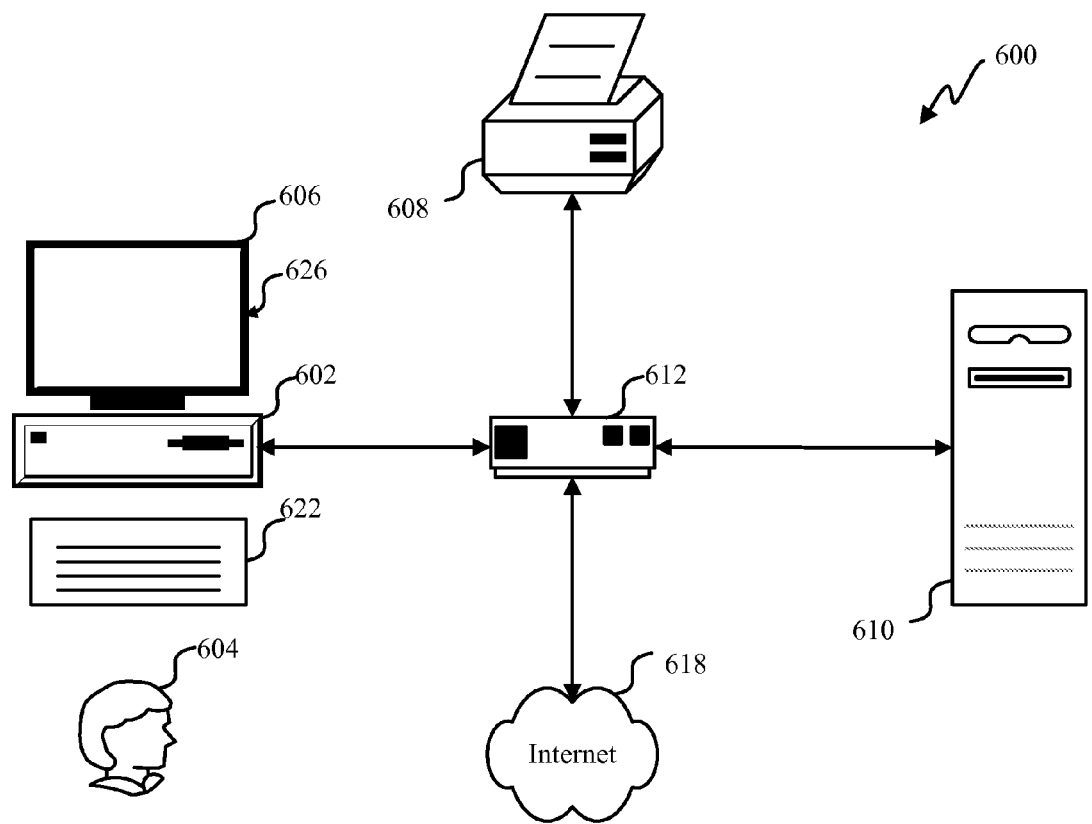
FIG. 6 provides a computer aided design (CAD) system, in accordance with various embodiments.

Referring next to FIG. 6, an exemplary environment with which embodiments may be implemented is shown with a computer aided design (CAD) system 600 that can be used by a designer 604 to design, for example, electronic circuits, which may be part of electronic design automation (EDA). The CAD system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. The monitor 606 can be a cathode ray tube (CRT), flat screen, etc.

A circuit designer 604 can input commands into the processor 602 using various input devices, such as a mouse, keyboard 622, track ball, touch screen, etc. If the CAD system 600 comprises a mainframe, a designer 604 can access the computer 602 using, for example, a terminal or terminal interface. Additionally, the computer system 626 may be connected to a printer 608 and a server 610 using a network router 612, which may connect to the Internet 618 or a WAN.

The server 610 may, for example, be used to store additional software programs and data. In one embodiment, software implementing the systems and methods described herein can be stored on a storage medium in the server 610. Thus, the software can be run from the storage medium in the server 610. In another embodiment, software implementing the systems and methods described herein can be stored on a storage medium in the computer 602. Thus, the software can be run from the storage medium in the computer system 626. Therefore, in this embodiment, the software can be used whether or not computer 602 is connected to network router 612. Printer 608 may be connected directly to computer 602, in which case, the computer system 626 can print whether or not it is connected to network router 612.

Figure 7:
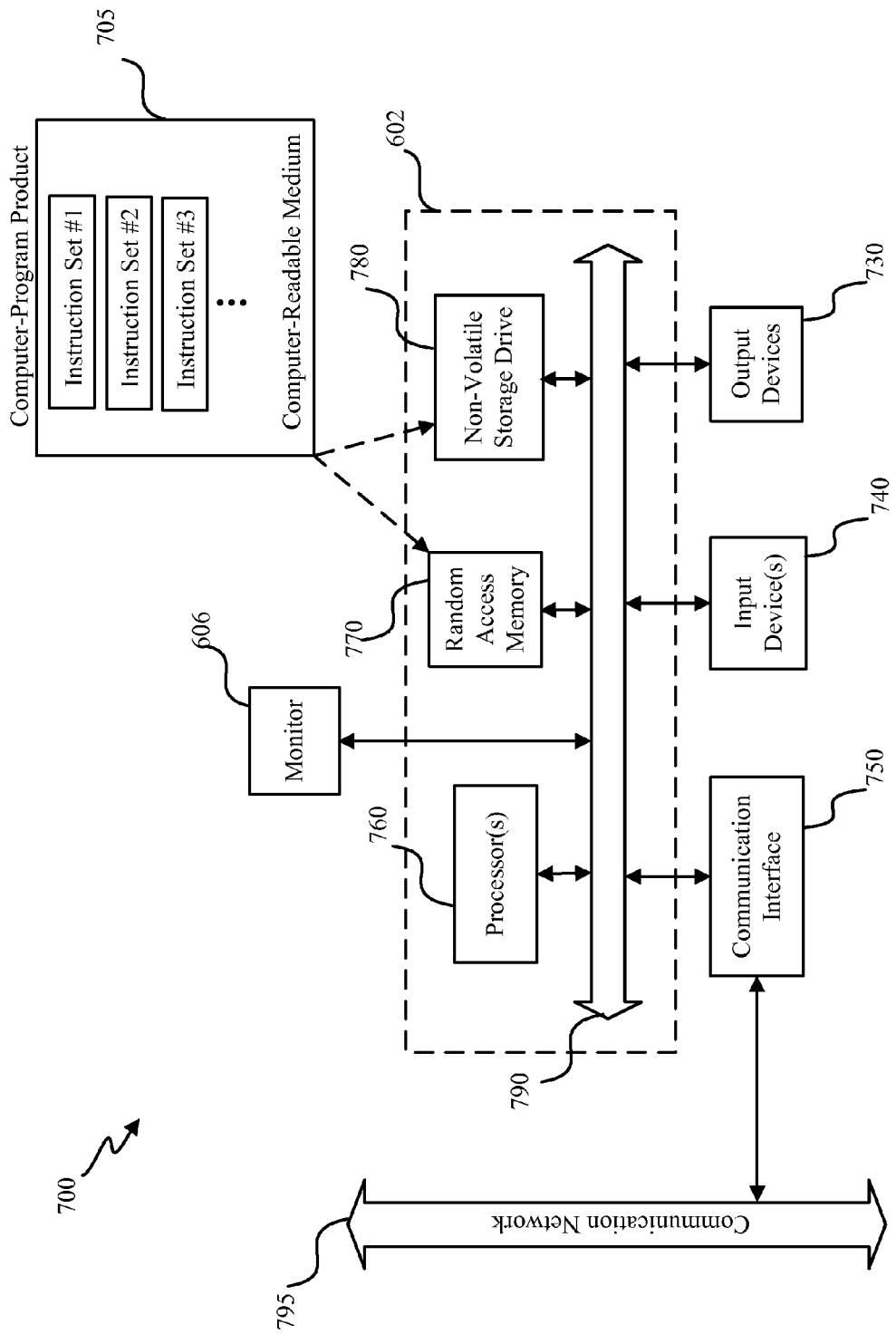
FIG. 7 provides a special-purpose computer system, in accordance with various embodiments.

With reference to FIG. 7, an embodiment of a special-purpose computer system 700 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 626, it is transformed into the special-purpose computer system 700 for CAD.

Special-purpose computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, and a computer-program product 705 stored in a tangible computer-readable memory in computer 602. Computer-program product 705 directs system 700 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft Corporation, Solaris® from Sun Microsystems, LINUX, UNIX, and the like.

User input devices 740 include all possible types of devices and mechanisms for inputting information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, or a voice command system. User input devices 740 typically allow a user to select objects, icons, text and the like that appear on the monitor 606 via a command such as a click of a button or the like. User output devices 730 include all possible types of devices and mechanisms for outputting information from computer 602. These may include a display (e.g., monitor 606), printers, non-visual displays such as audio output devices, etc.

Communications interface 750 provides an interface to other communication networks and devices and may serve as an interface for receiving data from and transmitting data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository for storing data and data structures used in accordance with the present invention. RAM 770 and non-volatile storage drive 780 may include a number of memories including a main random access memory (RAM) for storage of instructions and data during program execution and a read-only memory (ROM) in which fixed instructions are stored. RAM 770 and non-volatile storage drive 780 may include a file storage subsystem providing persistent (non-volatile) storage for program and/or data files. RAM 770 and non-volatile storage drive 780 may also include removable storage systems, such as removable flash memory.

Bus subsystem 790 provides a mechanism for letting the various components and subsystems of computer 602 to communicate with each other as intended. Although bus subsystem 790 is shown schematically as a single bus, alternative embodiments of the bus subsystem may utilize multiple busses or communication paths within the computer 602.

The previous description provides exemplary embodiments only and is not intended to limit the scope, applicability, or configuration of the disclosure. Rather, the previous description of the exemplary embodiments will provide those skilled in the art with an enabling description for implementing one or more exemplary embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could have also included additional steps or operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

While detailed descriptions of one or more embodiments have been given above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention.

What is claimed is:

1. A method of clustering failing runs in a design verification environment to aid in determining causes of the failing runs, the method comprising:

determining a plurality of failing runs of the design verification environment;

generating a plurality of partitions of the plurality of failing runs, each respective partition partitions one or more subsets of the plurality of failing runs into one or more non-overlapping clusters of failing runs, wherein each core cluster of the one or more non-overlapping clusters represents a different bug;

merging the plurality of partitions of the plurality of failing runs into a hierarchical structure that includes at least one of the clusters; and selecting one or more clusters of failing runs from the merged hierarchical structure.

2. The method of clustering failing runs in a design verification environment to aid in determining causes of the failing runs of claim 1, wherein the one or more clusters is each represented by one or more attributes.

3. The method of clustering failing runs in a design verification environment to aid in determining causes of the failing runs of claim 2 further comprising:

determining one or more grades for each respective cluster based on their respective attributes.

4. The method of clustering failing runs in a design verification environment to aid in determining causes of the failing runs of claim 3, wherein the one or more grades includes at least an external grade, an internal grade, or a total grade, where an external grade represents a measures of a union of all attributes that correlate with a failure, the internal grade represents a measure of whether the cluster is consistent, and the total grade represents a measure of the internal and external grade.

5. The method of clustering failing runs in a design verification environment to aid in determining causes of the failing runs of claim 1, further comprising:

separating the plurality of failing runs into a plurality of failure classes and wherein generating the plurality of partitions of failure runs includes partitioning into the separate classes.

6. The method of clustering failing runs in a design verification environment to aid in determining causes of the failing runs of claim 1 further comprising:

receiving user input to determine one or more of the plurality of partitions.

7. The method of clustering failing runs in a design verification environment to aid in determining causes of the failing runs of claim 6, wherein the receiving user input includes receiving coverage definitions.

8. The method of clustering failing runs in a design verification environment to aid in determining causes of the failing runs of claim 1 further comprising:

presenting the selected one or more clusters to a user.

9. The method of clustering failing runs in a design verification environment to aid in determining causes of the failing runs of claim 8, wherein presenting the selected one or more clusters to users includes presenting the identified clusters in specific order.

10. The method of clustering failing runs in a design verification environment to aid in determining causes of the failing runs of claim 9, wherein the specific order comprises an order based on a distance metric between clusters.

11. The method of clustering failing runs in a design verification environment to aid in determining causes of the failing runs of claim 10, wherein a first cluster in the specific order is a largest cluster from the merged hierarchy.

12. A system for clustering failing runs in a design verification environment to aid in determining causes of the failing runs, the system comprising:

a storage medium;

a processor coupled with the storage medium, the processor configured for clustering failing runs of the design verification environment by a configuration to:

determine a plurality of failing runs of the design verification environment;

generate a plurality of partitions of the plurality of failing runs, each respective partition partitions one or more subsets of the plurality of failing runs into one or more non-overlapping clusters of failing runs, wherein each core cluster of the one or more non-overlapping clusters represents a different bug;

merge the plurality of partitions of the plurality of failing runs into a hierarchical structure that includes at least one of the clusters; and select one or more clusters of failing runs from the merged hierarchical structure.

13. The system for clustering failing runs in a design verification environment to aid in determining causes of the failing runs of claim 12, wherein the processor configured for clustering failing runs of the design verification environment by a further configuration to:

separate the plurality of failing runs into a plurality of failure classes and wherein generating the plurality of partitions of failure runs includes partitioning into the separate classes.

14. The system for clustering failing runs in a design verification environment to aid in determining causes of the failing runs of claim 12, wherein the processor configured for clustering failing runs of the design verification environment by a further configuration to:

receive user input to determine one or more of the plurality of partitions.

15. The system for clustering failing runs in a design verification environment to aid in determining causes of the failing runs of claim 14, wherein the receiving user input includes receiving coverage definitions.

16. The system for clustering failing runs in a design verification environment to aid in determining causes of the failing runs of claim 12, wherein the processor configured for clustering failing runs of the design verification environment by a further configuration to:

presenting the selected one or more clusters to a user.

17. The system for clustering failing runs in a design verification environment to aid in determining causes of the failing runs of claim 16, wherein presenting the selected one or more clusters to users includes presenting the identified clusters in specific order.

18. The system for clustering failing runs in a design verification environment to aid in determining causes of the failing runs of claim 17, wherein the specific order comprises an order based on a distance metric between clusters.

19. The system for clustering failing runs in a design verification environment to aid in determining causes of the failing runs of claim 18, wherein a first cluster in the specific order is a largest cluster from the merged hierarchy.

20. A non-transitory machine-readable storage medium containing program instructions that, when executed by a controller within a computer, cause the controller to execute a method of clustering failing runs in a design verification environment to aid in determining causes of the failing runs, the method comprising:

determining a plurality of failing runs of the design verification environment;

generating a plurality of partitions of the plurality of failing runs, each respective partition partitions one or more subsets of the plurality of failing runs into one or more non-overlapping clusters of failing runs, wherein each core cluster of the one or more non-overlapping clusters represents a different bug;

merging the plurality of partitions of the plurality of failing runs into a hierarchical structure that includes at least one of the clusters; and selecting one or more clusters of failing runs from the merged hierarchical structure.

21. The non-transitory machine-readable storage medium of claim 20, wherein the one or more clusters is each represented by one or more attributes.

22. The non-transitory machine-readable storage medium of claim of claim 21 further comprising:

determining one or more grades for each respective cluster based on their respective attributes.

23. The non-transitory machine-readable storage medium of claim of claim 22, wherein the one or more grades includes at least an external grade, an internal grade, or a total grade, where an external grade represents a measures of a union of all attributes that correlate with a failure, the internal grade represents a measure of whether the cluster is consistent, and the total grade represents a measure of the internal and external grade.

24. The non-transitory machine-readable storage medium of claim of claim 20 further comprising:

receiving user input to determine one or more of the plurality of partitions.

25. The non-transitory machine-readable storage medium of claim 20 further comprising:

presenting the selected one or more clusters to a user.

26. The non-transitory machine-readable storage medium of claim of claim 25, wherein presenting the selected one or more clusters to users includes presenting the identified clusters in specific order.

27. The non-transitory machine-readable storage medium of claim of claim 26, wherein the specific order comprises an order based on a distance metric between clusters.

* * * * *